Sept. 26, 1967    P. D. FLYNN ET AL    3,343,447
COMPENSATING PLATE FOR OBLIQUE INCIDENCE
Filed April 30, 1963    2 Sheets-Sheet 1

INVENTORS.
PAUL D. FLYNN
JOSEPH T. GILBERT
ARTHUR A. ROLL
BY Harry M. Saragovitz
Edward J. Kelly, Herbert Berl & S. Subroff
ATTORNEYS.

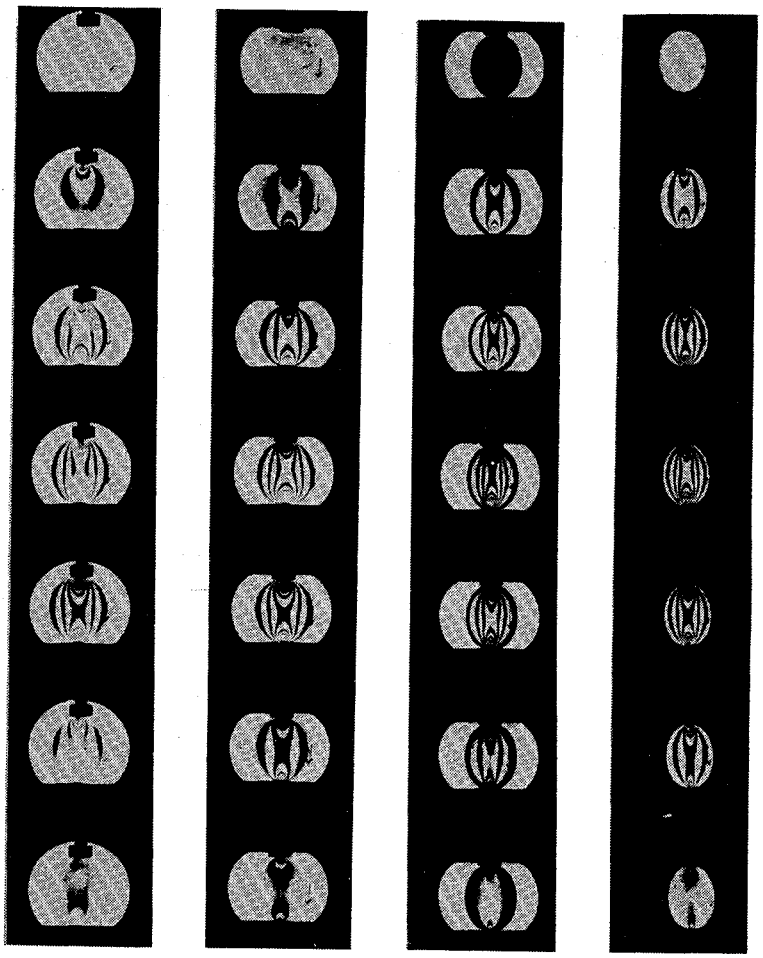
A B C D

United States Patent Office 3,343,447
Patented Sept. 26, 1967

3,343,447
COMPENSATING PLATE FOR OBLIQUE
INCIDENCE
Paul D. Flynn, Joseph T. Gilbert, and Arthur A. Roll, Philadelphia, Pa., assignors to the United States of America as represented by the Secretary of the Army
Filed Apr. 30, 1963, Ser. No. 277,428
4 Claims. (Cl. 88—14)

The invention described herein may be manufactured and used by and for the Government for governmental purposes without the payment to us of any royalty thereon.

This invention relates to photoelasticity and photoelastic stress patterns. More particularly, the invention relates to an improved method and apparatus for obtaining photoelastic stress patterns at either oblique or normal incidence.

It is well-known that many transparent isotropic solids exhibit a phenomenon known as the photoelastic effect, i.e., undergo certain changes in optical properties when subjected to stresses. For example, a block of glass will exhibit temporary birefringence or double refraction when put under tension or compression. If the block is placed in a field of circularly polarized white light, the field will remain unchanged so long as the glass is in no-load condition, but as stress is applied, colored fringes appear. This principle has been adapted to the study of stresses in photoelastic models of structural parts and an instrument known as a polariscope is commonly employed in such work.

In the study of photoelasticity, a useful tool for the past twenty years has been the so-called "method of oblique incidence." This method is employed for separating principal stresses and involves repeated tests, usually one at normal incidence and the other at oblique incidence. However, the universality of the method is seriously affected by the well-known fact that some photoelastic materials show no initial stresses at normal incidence and exhibit an initial birefringence at oblique incidence. This optical behavior stems from the type of stress system induced during the manufacture of the photoelastic material.

Proposed attempts to solve the problem of initial birefringence at oblique incidence have resulted in two unsatisfactory solutions. In the one case, equations requiring measurement of the initial birefringence have been evolved for correcting the final fringe pattern for the initial pattern. However, the measurement and correction involved are both time-consuming and subject to error. In the other case it is proposed to use only those photoelastic materials which do not exhibit the undesirable phenomenon. Unfortunately, the latter materials do not predominate and most of the materials which are desirable from other points of view do exhibit this phenomenon.

Accordingly, a principal object of the invention is to provide an improved method of compensating for oblique incidence, initial birefringence unattended by the aforementioned disadvantages of the prior art.

Another object of the invention is to provide a compensating plate for oblique incidence, initial birefringence for use with a polariscope.

Still another object of the invention is to provide an improved apparatus for obtaining photoelastic stress patterns unaffected by initial birefringence at oblique incidence.

Other objects of the invention will in part be obvious and in part appear hereinafter in the following detailed description and accompanying drawings, wherein:

FIG. 2 shows dynamic photoelastic stress patterns of a circular disk subjected to diametral impact.

In accordance with the present invention the effect of the initial birefringence in a photoelastic model is eliminated by introducing a compensating plate, made from the same sheet of material, in series and coaxial with the model and rotated by an angle $\theta$ about an axis perpendicular to the axis about which the model is rotated by an angle $\phi$ of oblique incidence, where $\phi$ equals $\theta$. The orientation of the compensating plate may be more fully understood by reference to FIG. 1. In this figure, C represents a compensating plate and M represents a photoelastic model. The axis of the polariscope is shown by the Z axis, which is coaxial with the beam of light from LS, a light source. X and Y are horizontal and vertical axes, respectively, defining plane M' perpendicular to the Z axis. Similarly, X' and Y' are horizontal and vertical axes, respectively, defining plane C' perpendicular to the Z axis. $\phi$ represents the angle of rotation of M about the Y axis and $\theta$ represents the angle of rotation of C about the X' axis. At normal incidence the photoelastic model, M, lies in the plane M', perpendicular to the axis of the polariscope; at oblique incidence, the model is rotated about an axis in this plane, here shown to be the Y axis, by an angle $\phi$. The compensating plate, C, is made from the same sheet of material as the model, M, and is placed in series and coaxial therewith. At normal incidence, compensating plate C may lie in plane C', perpendicular to the axis of the polariscope, or be removed entirely from the polariscope. In either case, the photoelastic stress patterns are unaffected. However, at oblique incidence, compensating plate C is rotated about the X' axis by an angle $\theta$, angles $\phi$ and $\theta$ being equal to each other.

In the course of the work leading to the present invention, several full image, dynamic photoelastic stress patterns, shown in FIG. 2, were obtained using a lens-type, mixed polariscope (polaroids parallel, quarter-wave plates crossed) having a light background in conjunction with a 16 mm. camera, operating at 7500 pictures per second.

Figure 1:
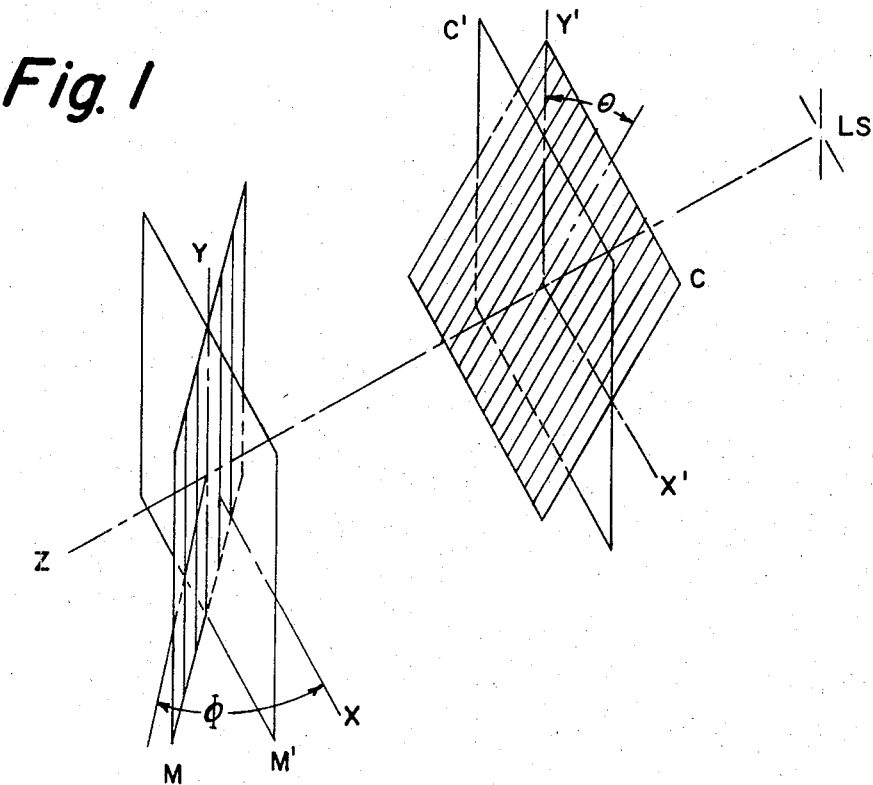
FIG. 1 depicts a schematism of the inventive compensating plate in series with a photoelastic model and oriented to eliminate oblique incidence, initial birefringence.
Figure 3:
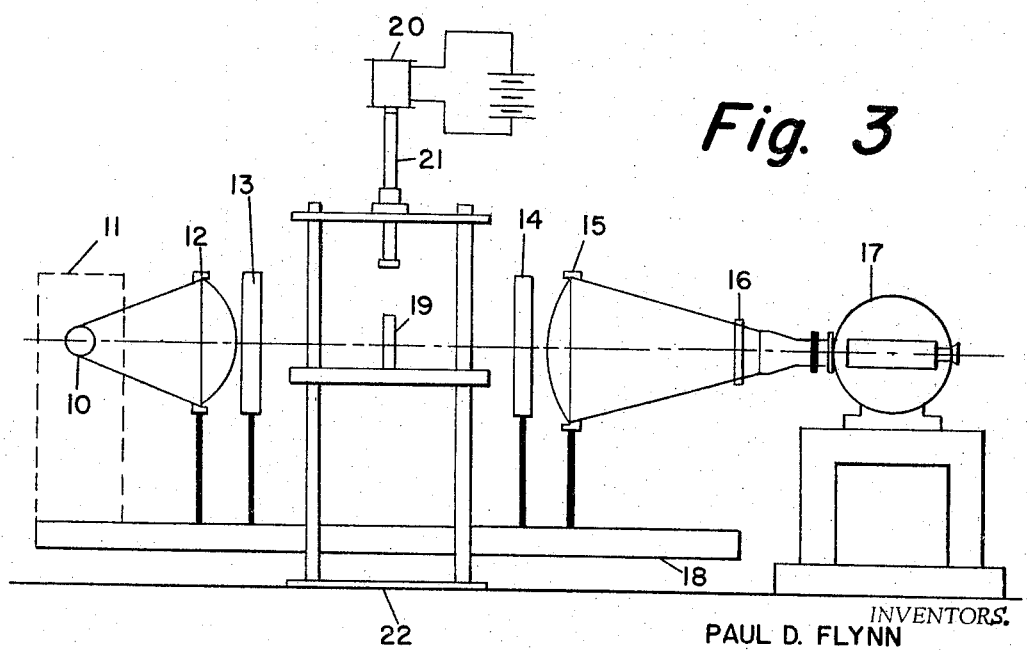
FIG. 3 schematically illustrates a polariscope.

A schematic illustration of this polariscope is shown in FIG. 3. The light source 10 consisted of a small arc (4.5 x 2.3 mm.), 500 watt mercury lamp encased in a housing 11. The light beam emitted was transmitted through a condenser lens 12 and thence through a polarizer 13 and analyzer 14, respectively, with quarter-wave plates crossed. The beam then passed through filters 16 before entering camera 17. For reducing exposure times, a stationary slit aperture (not shown) was inserted between the rotating prism and the moving film of camera 17. An optical bench 18 was used to support the polariscope components. Photoelastic model 19 together with the loading system therefor comprising electromagnet 20 and impact rod 21 were supported by loading frame 22. A special control unit (not shown) was used to operate camera 17 and to synchronize the electromagnetic release of impact rod 21. The model employed was a circular disk of polyester resin which was subjected to diametral impact. FIG. 2(A), depicting stress patterns at exposures of 44 microseconds obtained with a standard aperture plate, reveals considerable blurring because of long exposure. When the exposure time was reduced to 1.3 microseconds by using a 0.003 in. slit aperture, FIG. 2(B), clear stress patterns were obtained showing the effects of stress-wave propagation. Oblique incidence stress patterns, FIG. 2(C) were obtained under dynamic conditions for their possible use in the separation of principal stresses. When the model was rotated 45 degrees about the line of stress symmetry, a birefringence of approximately ½ fringe was observed due to initial stresses. FIG. 2(D) depicts the stress patterns resulting from the introduction of a compensating plate, made from the same sheet of material, in series with the model and oriented as aforedescribed and as depicted in FIG. 1. In FIG. 2(D)

the background appears dark because of the initial birefringence in the compensating plate which covers the entire field.

It is, of course, understood that various changes may be made in the method and apparatus specifically described herein without departing from the spirit and scope of the invention.

Having thus described our invention so that others skilled in the art may be able to understand and practice the same, we state that what we desire to secure by Letters Patent is defined in what is claimed.

We claim:

1. An improved method of compensating for oblique incidence, initial birefringence in a photoelastic model, said method comprising placing a compensating plate made from the same sheet of material as said model in series and coaxial therewith and rotating said compensating plate by an angle $\theta$ about a second axis perpendicular to the first axis about which said model is rotated by an angle $\phi$ of oblique incidence, said first axis and said second axis being mutually perpendicular and said first axis and said second axis each being perpendicular to the axis of coaxial alignment of said plate and said model, said angles $\phi$ and $\theta$ being equal to each other.

2. In the method of oblique incidence for separating principal stresses in a photoelastic model of a structural part, the improvement comprising eliminating oblique incidence, initial birefringence in said model by inserting a compensating plate made from the same sheet of material as said model in series and coaxial therewith and rotating said compensating plate about a second axis perpendicular to the first axis about which said model is rotated by an angle of oblique incidence, said first axis and said second axis being mutually perpendicular and said first axis and said second axis each being perpendicular to the axis of coaxial alignment of said plate and said model, the angle of rotation of said compensating plate being equal to the angle of rotation of said model.

3. In a polariscope-camera arrangement designed to obtain exposures of dynamic photoelastic stress patterns of a model subjected to impact, the improvement in combination therewith comprising a compensating plate made from the same sheet of material as said model in series and coaxial therewith and rotated about a second axis perpendicular to the first axis about which said model is rotated by an angle of oblique incidence, said first axis and said second axis being mutually perpendicular and said first axis and said second axis each being perpendicular to the axis of coaxial alignment of said plate and said model, the angle of rotation of said compensating plate being equal to the angle of rotation of said model.

4. An improved polariscope so constructed and arranged that oblique incidence, initial birefringence in a photoelastic model is eliminated, said polariscope containing a compensating plate made from the same sheet of material as said model in series and coaxial therewith and rotated by an angle $\theta$ about a second axis perpendicular to the first axis about which said model is rotated by an angle $\phi$ of oblique incidence, said first axis and said second axis being mutually perpendicular and said first axis and said second axis each being perpendicular to the axis of coaxial alignment of said plate and said model, said angles $\phi$ and $\theta$ being equal to each other.

References Cited

Flynn, P. D.; Feder, J. C.; Gilbert, J. T.; Roll, A. A.: Some New Techniques For Dynamic Photoelasticity, Experimental Mechanics, May, 1962. (Copy furnished by applicant.)

Doker, E. G., Ficon, L. N. G.: A Treatise on Photo-Elasticity, Cambridge, The University Press, 1967. pp. 251–253. TA 406C6 1957.

Flynn, P. D., et al.: Impact Stresses in Low Modulus Photoelastic Materials. In Photoelasticity, ed. by M. M. Frocht, N.Y., MacMillan, 1963, pp. 265–275. TA 406 I5 1961 C.2. (The information in the above reference was presented at the International Symposium held at The Illinois Institute of Technology, Chicago, Illinois, October 1961, and is considered to be in the public domain at that time.)

JEWELL H. PEDERSEN, *Primary Examiner.*

A. A. KASHINSKI, *Assistant Examiner.*